United States Patent [19]

Smith, Jr. et al.

[11] 4,022,446
[45] * May 10, 1977

[54] QUENCHING IN HOT GAS ISOSTATIC PRESSURE FURNACE

[75] Inventors: Charles W. Smith, Jr., Fairview; Franz X. Zimmerman, Erie, both of Pa.

[73] Assignee: Autoclave Engineers, Inc., Erie, Pa.

[ * ] Notice: The portion of the term of this patent subsequent to Feb. 24, 1993, has been disclaimed.

[22] Filed: Oct. 23, 1975

[21] Appl. No.: 624,786

[52] U.S. Cl. .................................. 266/252; 13/31; 165/106; 266/251
[51] Int. Cl.² ........................................ C21D 1/74
[58] Field of Search ................... 432/249; 165/106; 266/250–254; 13/31

[56] References Cited
UNITED STATES PATENTS

| 2,636,752 | 4/1953 | Schane et al. ............... 165/106 X |
| 3,470,624 | 10/1969 | Plotkowiak .................. 266/254 X |
| 3,548,062 | 12/1970 | Smith, Jr. ........................ 13/31 X |
| 3,628,779 | 12/1971 | Lundstrom ....................... 266/251 |
| 3,900,189 | 8/1975 | Elmgren et al. ............. 266/249 X |
| 3,940,245 | 2/1976 | Smith, Jr. et al. ............. 432/249 |

Primary Examiner—Roy Lake
Assistant Examiner—Paul A. Bell
Attorney, Agent, or Firm—Ralph Hammar

[57] ABSTRACT

A work piece in a hot gas isostatic bonding furnace is cooled by increasing convection within the furnace prior to depressurizing. The convection may be wholly due to thermal gradients or may be supplemented by a compressor. The cooling jacket for the furnace walls may supply the entire cooling or may be supplemental heat exchanger. The quenching takes place within the furnace without changing the atmosphere.

13 Claims, 2 Drawing Figures

QUENCHING IN HOT GAS ISOSTATIC PRESSURE FURNACE

This invention is intended to quench work pieces inside a hot isostatic pressing unit by circulating the gas over heat exchanger. This air circulation may be the natural circulation due to the gas density or by a compressor. The heat exchanger may be the cooling jacket for the furnace walls or an external cooling unit.

The invention is shown in furnace of application Ser. No.533,828.

Figure 1:
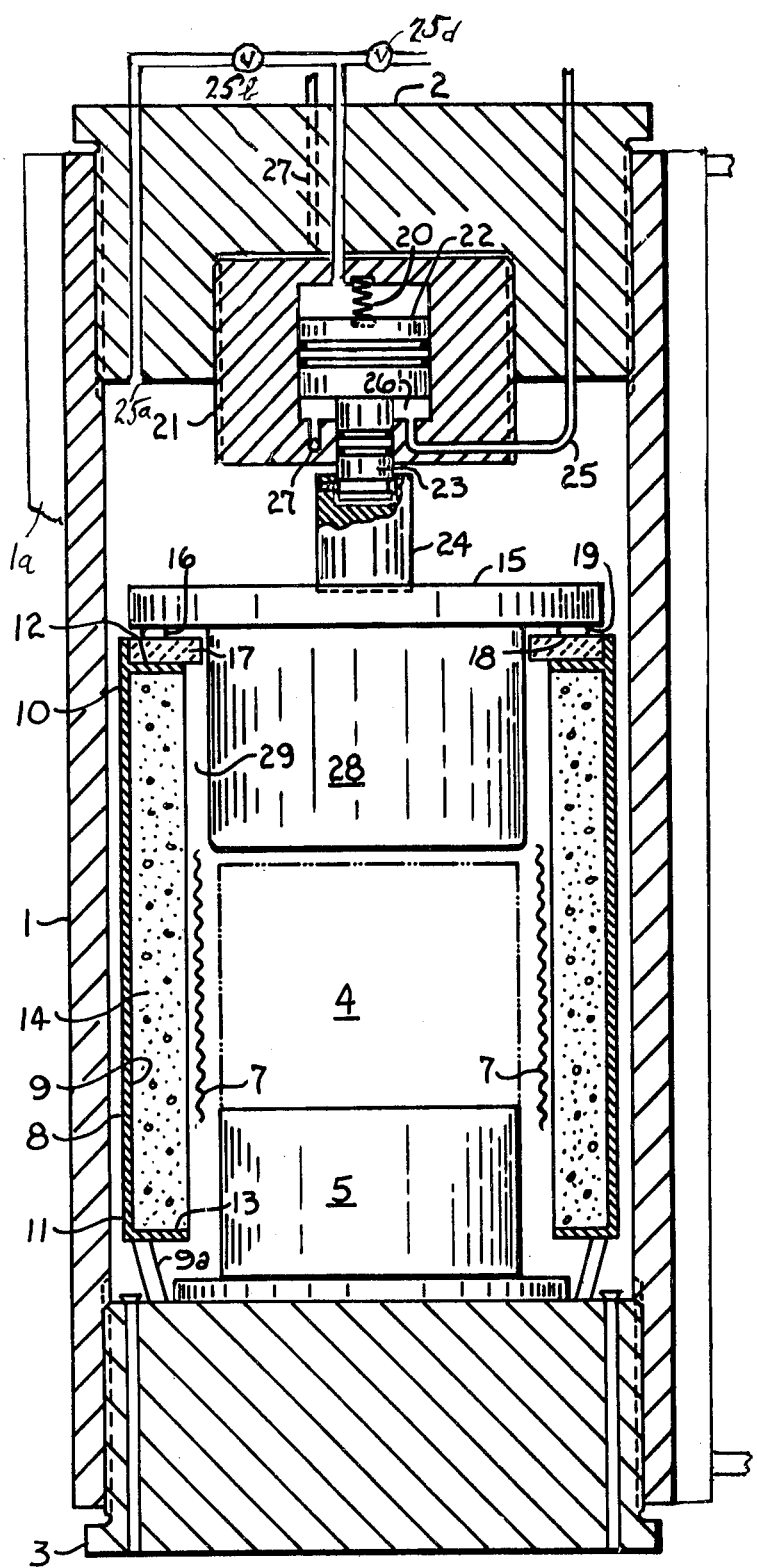
Figure 2:
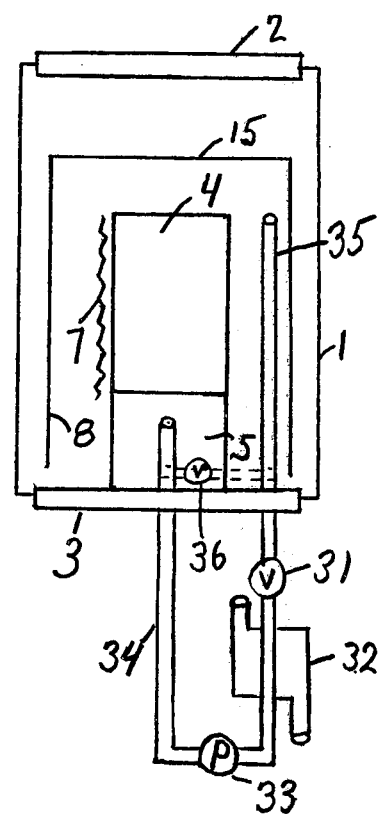

In the drawing FIG. 1 is a section through a preferred hot gas isostatic bonding furnace equipped with structure for rapid quenching and FIG. 2 is a diagram showing a differnt structure for quenching.

In a preferred embodiment incorporated by reference described in greater detail in Patent 3,940,245 the hot isostatic pressing and diffusing bonding furnace comprises a pressure vessel having upright tubular side walls 1 cooled by a water jacket 1a and top and bottom closures 2, 3. The work 4 is carried on a pedestal 5 extending upward from a suitable support (not shown) on the bottom closure. Electric neating elements 7 surround the work and create a hot zone required for heating the work. Insulation (not shown) in and around pedestal 5 results a cool zone at the lower end of the pedestal. The foregoing is of common construction and may differ substantially from the structure illustrated.

To prevent convection between the hot zone of the furnace and the walls 1 of the pressure vessel, a convection shield 8 is provided which surrounds the top and sides of the furnace and extends to the cool zone below the furnace. This shield is impermeable to gas at its top and sides and is open at the bottom for pressure equalization. Convection currents due to thermal gradients between the furnace and the cooled walls of the pressure vessel are positively prevented.

The convection shield has a tubular metal shell 9 spaced inward from the side walls 1 of the pressure vessel with its upper end 10 extending substantially above the hot zone of the furnace and with its lower end 11 depending into the cool zone adjacent the bottom closure 3 and supported on the closure by brackets 9a. The shell has flanges 12, 13 and its upper and lower ends defining a tubular space into which is cast refractory concrete or cement insulation 14. The refractory cement may be any of the commercially available cements which can stand the operating temperature, which will block mass flow of the gas through the cement but which are sufficiently porous to permit diffusion of the gas into the cement, and which have a coefficient of thermal expansion such that the shell holds it under compression at the operating temperatures. The compression greatly increases the life by preventing cracks on the inner surface of the refractory. The combination of a steel shell and an alumina cement has given satisfactory results for operation at temperatures of 2800° F and pressures of 15,000 lbs/sq. in.

The upper end of the convection shield is closed hermetically or gas tight by a cover 15, a gasket 16 and a sealing ring 17. The sealing ring is integral with the flange 12 and has a gasket surface 18 for the gasket. The cover has a surface 19 for the gasket. Sealing pressure is applied to the cover by a spring 20 in thrust relation between the cover and the top closure 2. The spring is located in a body 21 removably fixed in the top closure. One end of the spring 20 is seated in the body 21 and the other end transmits a force to cover through piston 22, piston 23, and ram 24 swivelled on the lower end of piston 23. The spring 20 exerts enough force to seal at low pressures. The piston 22 which is supplied with gas working pressure through way 25a, valve 25b and way 25c supplies enough sealing force to prevent leakage at any higher working pressure. This is important; if there were leakage through the gasket 16, convection would be set up through the leak and gas would circulate from the work piece 4 to the cold walls 1 and the resultant turbulence in the hot zone would cause uncontrollable variation in temperatures about the work piece 4. Absence of leakage becomes more important at higher pressures since convection increases faster than pressure. The way 25c may be vented to the atmosphere through valve 25d after first closing the valve 25b.

To prevent overheating of the pistons 22, 23 coolant may be circulated through inlet way 25 leading to space 26 between the pistons and outlet way 27 leading from the space 26. Similar cooling (not shown) may be provided for the remainder of top closure 2. The way 27 is similar to way 25 in configuration but is in a plane at right angles to the plane of way 25. A plug 28 of castable refractory such as alumina cement is mounted on the cover 15 to insulate the cover and reduce the quantity of gas required. A similar plug may be mounted on the ram 24. The gas remains relatively quiet in the narrow space 29 around the plug 28.

FIG. 1 shows the apparatus in position for hot isostatic pressing. The work piece 4 is mounted on the pedestal 5. The cover 15 is mounted on the sealing ring 17 at the upper end of the convection shield 8. The closure 2 which carries the ram 24 and the associated parts is mounted in the upper end of the pressure vessel. The pressure vessel is pressurized with an inert gas sucn as argon, etc., and the heating elements 7 are energized by suitable control (not shown). The work piece is heated to the desired temperature e.g. 2800° F and subjected to the pressure of the hot gas which for example may be 15,000 pounds per square inch. The hot gas serves as the heat transfer medium between the heating element 7 and the work piece 4, and also as the pressing medium for compacting the work piece. During this stage of the operation the valve 25b is open and the valve 25d is closed. The pressure of the gas within the vessel is fed through way 25c to the top of piston 22 exerting a downward force holding the cover 25 in sealing relation to the upper end 12 of the convection shield 8. Under these conditions convection between the got gases surrounding the work piece 4 and the walls 1 of the pressure vessel are positively prevented.

In some applications, it is desired that the work piece 4 be quickly quenched at the end of the isostatic pressing operation. This is accomplished by closing the valve 25b and opening the valve 25d. Closing the valve 25b seals the hot gas within the pressure vessel. Opening the valve 25d vents the upper side of the piston 22 to the atmposphere and allows the gas pressure acting on the lower end of the piston 23 to lift the pistons 22 and 23 and the ram 24 relieving the sealing pressure on the cover 15. The cover 15 which formerly had to seal the upper end of the convection shield 8 to prevent convection now is released and is lifted to encourage convection. The hot gases within the convection shield rise and come in contact with the water cooled walls 1 of the vessel (and with the water cooled portions of the top closure 2). The cooling causes the gas to sink to the lower part of the pressure vessel and then enter the open lower end of the convection shield. Under isostatic pressing conditions, the temperature of the gas around the work piece is about twice the temperature of the lower end of the convection shield 8. The convection currents set up by releasing the seal between the cover 18 and the upper end of the convection shield continually brings colder and denser gas into contact with the work piece 4 and then after absorbing the heat from the work piece recycles the heated gas into cooling contact with the top and side walls of the pressure vessel. This results in a very rapid cooling of the work piece due to the high rate of heat transfer of the dense gas. This cooling of the work piece takes place without changing the furnace atmosphere in any way.

FIG. 2 shows another arrangement for quick quenching of the work piece which may be used in place of or as a supplement to FIG. 1 construction. FIG. 2 is diagramatic and indicates the position rather than the structure of the elements. The pressure vessel has side walls 1 and top and bottom closures 2 and 3. Within the side walls is a convection shield 8 having a top closure 15 which is shown permanently sealed to the upper end of the convection shield. One of the heating elements 7 is shown opposite the work piece 4. The parts so far described are those used for hot isostatic pressing.

For quick quenching of the work piece there is provided a tube 35 having its upper end in the upper part of the hot zone of the furnace and its lower end extending out through the bottom closure 3 to a valve 31 which is closed during the hot isostatic pressing operation. When quick quenching is desired the valve 31 is opened and the hot gases enter the upper end of the tube 30 and flow down through the valve 31 through heat exchanger 32 and through compressor 33 which discharges to the lower end of a tube 34 leading to the lower end of the work piece 4. The upper ends of tubes 35 and 34 are open at all times but gas flows through these tubes only when the valve 31 is open. The circulation is in part the convection due to the cooling of the hot gases by the heat exchanger 32 and in part to the force of the compressor 33. If the lower ends of the tubes 35, 34 terminate adjacent the top surface of closure 3, the external valve 31, heat exchanger 32 and compressor 33 may be omitted and the lower ends of the tubes connected by a valve 36 which will be closed during pressing and opened during quenching. The end result is the removal of the hot gas from the upper hot gas zone at the upper end of the work piece 4 and the return of cold gas to the cool zone at the lower end of the work piece.

We claim:

1. A furnace for hot gas isostatic pressing, diffusion bonding and the like comprising a pressure vessel having means for holding gas at high pressure, said vessel having tubular side walls 1 with a top closure and a bottom closure, means for creating a work receiving hot zone in the upper part of the vessel and a cool zone in the lower part of the vessel, means for creating a path for withdrawing gas from the hot zone through a cooling heat exchange means and returning the gas to the cool zone, means for blocking flow of gas in said path, and means for unblocking flow in said path to permit rapid circulation of the gas in said path and the resultant cooling of work in said hot zone.

2. The furnace of claim 1 in which the path is further defined as wholly within the vessel.

3. The furnace of claim 1 in which the heat exchange means is further defined as outside the vessel.

4. The furnace of claim 1 in which the heat exchange means is further defined as cooling means in heat exchange relation to the walls of the vessel.

5. The furnace of claim 1 in which the path is further defined as including a conduit open at its upper end to receive gas from said hot zone and a valve for blocking the flow through the conduit.

6. The furnace of claim 1 in which the path is further defined as between the top and side walls of a convection shield spaced inward from the walls of the vessel and normally blocking convection between the hot zone and the walls of the vessel.

7. The furnace of claim 6 in which the convection shield has an impervious tubular shell open at the top and bottom and spaced inward from the vessel side walls and surrounding the hot and cool zones and having its open top spaced below the top closure and the means for blocking convection comprises a cover closing the open top of the shell and a piston means in thrust relation between the top closure and the cover and energized by vessel gas pressure for forcing the cover into gas tight sealing engagement with the open top of the shell.

8. The furnace of claim 1 in which the path comprises a conduit communicating with the hot zone and extending out through the vessel to a heat exchanger outside the vessel and a return conduit leading to the cool zone.

9. The furnace of claim 8 in which the return conduit includes a compressor.

10. The furnace of claim 8 in which the means for blocking the flow of gas in said path comprises a valve outside said vessel.

11. The furnace of claim 7 in which rapid circulation for cooling is effected by relieving the energizing pressure on said piston as the gas can flow out the top of the shell.

12. The apparatus of claim 1 in which the cooling heat exchange means comprises the inner surface of the pressure vessel walls.

13. The furnace of claim 12 in which the path includes a stand pipe having its upper end receiving gas from the hot zone and its lower end delivering gas to the cool zone.

* * * * *